(12) United States Patent
Suzuki (10) Patent No.: US 8,643,723 B2
(45) Date of Patent: Feb. 4, 2014

(54) LANE-MARKER RECOGNITION SYSTEM WITH IMPROVED RECOGNITION-PERFORMANCE

(75) Inventor: Shunsuke Suzuki, Aichi-ken (JP)

(73) Assignee: Denso Corporation, Kariya (JP)

( * ) Notice: Subject to any disclaimer, the term of this patent is extended or adjusted under 35 U.S.C. 154(b) by 407 days.

(21) Appl. No.: 12/932,204

(22) Filed: Feb. 18, 2011

(65) Prior Publication Data

US 2011/0205362 A1   Aug. 25, 2011

(30) Foreign Application Priority Data

Feb. 22, 2010  (JP) ................................. 2010-035930

(51) Int. Cl.
*H04N 7/18* (2006.01)
(52) U.S. Cl.
USPC ........................................................ 348/148
(58) Field of Classification Search
USPC .................. 348/118, 148; 340/435, 436, 905; 382/103, 173; 345/7; 701/46, 96
See application file for complete search history.

(56) References Cited

U.S. PATENT DOCUMENTS

| | | | | |
|---|---|---|---|---|
| 6,856,696 | B1 * | 2/2005 | Ajioka | 382/173 |
| 2004/0183663 | A1 | 9/2004 | Shimakage | |
| 2005/0135658 | A1 | 6/2005 | Yamamoto et al. | |
| 2008/0273750 | A1 * | 11/2008 | Fujimoto | 382/103 |
| 2010/0080467 | A1 | 4/2010 | Sakurai | |
| 2010/0253540 | A1 * | 10/2010 | Seder et al. | 340/905 |

FOREIGN PATENT DOCUMENTS

| | | |
|---|---|---|
| JP | 06-124398 | 5/1994 |
| JP | 2002-163642 | 6/2002 |
| JP | 2004-021723 | 1/2004 |
| JP | 2004-268845 | 9/2004 |
| JP | 3624867 | 12/2004 |
| JP | 2005-157670 | 6/2005 |
| JP | 2007-179386 | 7/2007 |
| JP | 4107587 | 4/2008 |
| JP | 2008-123036 | 5/2008 |
| JP | 4196211 | 10/2008 |
| JP | 4222411 | 11/2008 |

OTHER PUBLICATIONS

Office action dated Jun. 26, 2012 in corresponding Japanese application No. 2010-035930.

(Continued)

*Primary Examiner* — Sath V Perungavoor
*Assistant Examiner* — Chia Lun Hang
(74) *Attorney, Agent, or Firm* — Harness, Dickey & Pierce, PLC (57) ABSTRACT

In a system installed in a vehicle, a pickup unit repeatedly picks up a frame image of a target region including a road ahead of the vehicle, and an extracting unit extracts an edge of a lane marker formed on the road from each of the frame images. A creating unit creates a history of the edges of the lane marker for the respective frame images. A detecting unit detects pitch of the vehicle. The creating unit omits, as a target edge, an edge from the history of the edges for the respective frame images. The target edge to be omitted is extracted from a frame image that is picked up by the pickup unit with the pitch being detected by the detecting unit. A recognizing unit recognizes a region of the lane marker based on the history of the edges of the lane marker.

6 Claims, 10 Drawing Sheets

(56) References Cited

OTHER PUBLICATIONS

Office action dated Dec. 20, 2011 in corresponding Japanese application No. 2010-035930.

N. Yamaguchi, N. Tamori, A. Shiomi, "A Lane Detection Method Using Adaptive Edge Preservative Smoothing", Institute of Electronics, Information and Communication Engineers (IEICE) Transactions on Information and Systems, Pt. 2 (2005), vol. J88-D-II No. 8, 1421-1431.

Office Action issued Jan. 29, 2013 in corresponding Japanese Application No. 2010-035930 with English translation.

* cited by examiner

LANE-MARKER RECOGNITION SYSTEM WITH IMPROVED RECOGNITION-PERFORMANCE

CROSS REFERENCE TO RELATED APPLICATIONS

This application is based on Japanese Patent Application 2010-035930 filed on Feb. 22, 2010. This application claims the benefit of priority from the Japanese Patent Application, so that the descriptions of which are all incorporated herein by reference.

TECHNICAL FIELD

The present disclosure relates to lane-marker recognition systems to be installed in motor vehicles, and more particularly, to such lane-marker recognition systems having an improved recognition-performance in comparison to that of conventional white-line recognition systems.

BACKGROUND

Lane markers, such as painted lane boundary markers (white lines) and raised markers, formed on a road work to divide the road into plural parts as lanes. Thus, in order to improve the running safety of motor vehicles, it is important for the motor vehicles in running one lane of a road ahead thereof to accurately recognize the lane markers formed on the road.

In view of the circumstances, white-line recognition systems are installed in motor vehicles. Such a white-line recognition system installed in a motor vehicle picks up an image (one frame image) of a region including a road ahead of the motor vehicle every preset time, and extracts edges of white lines marked on the road for each frame image picked up by the camera. In addition, the white-line recognition system successively stores the extracted edges for each frame image to thereby create a history of the extracted edges of white lines, and recognizes white lines marked on the road using the history of the extracted edges. One of these white-line recognition systems is disclosed in Japanese Patent Application Publication No. 2005-157670.

SUMMARY

The inventors have discovered that there is a point that should be improved in the white-line recognition systems set forth above.

Pitch of a running motor vehicle, such as the nose up and the tail down (nose down and tail up), may be caused by steps along roads, obstacles, acceleration or deceleration of the motor vehicle, or the like. Pitch of a running motor vehicle may cause edges of while lines in a picked-up frame image to be tapered (see FIG. 11). Note that liner lines drawn outside of the white lines in the picked-up image in FIG. 11 would be matched with edges of the white lines in a picked-up image if no pitch of the motor vehicle were caused.

Figure 11:
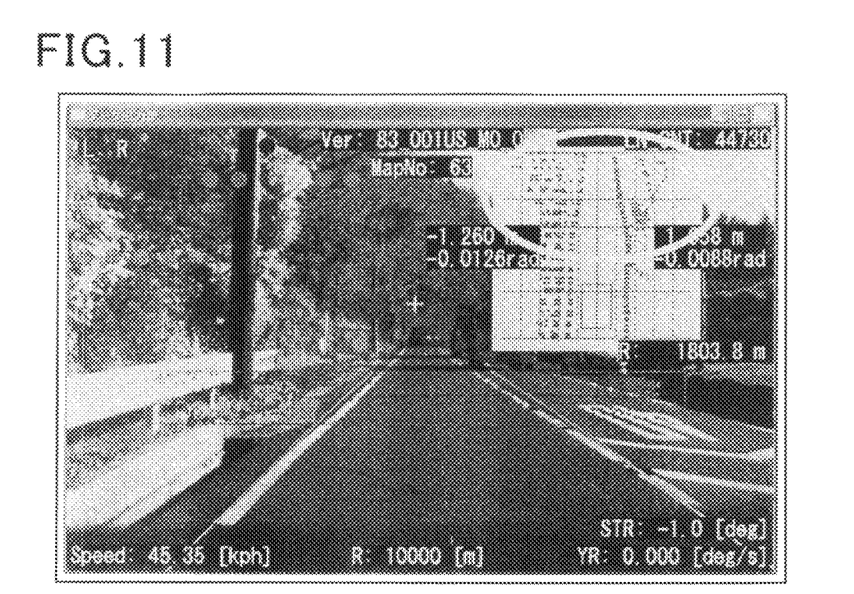
FIG. 11 is a view illustrating image data in which extracted edges by a known white-line recognition system are deviated if pitch of a motor vehicle is caused from those if no pitch of the motor vehicle is caused.
Figure 12:
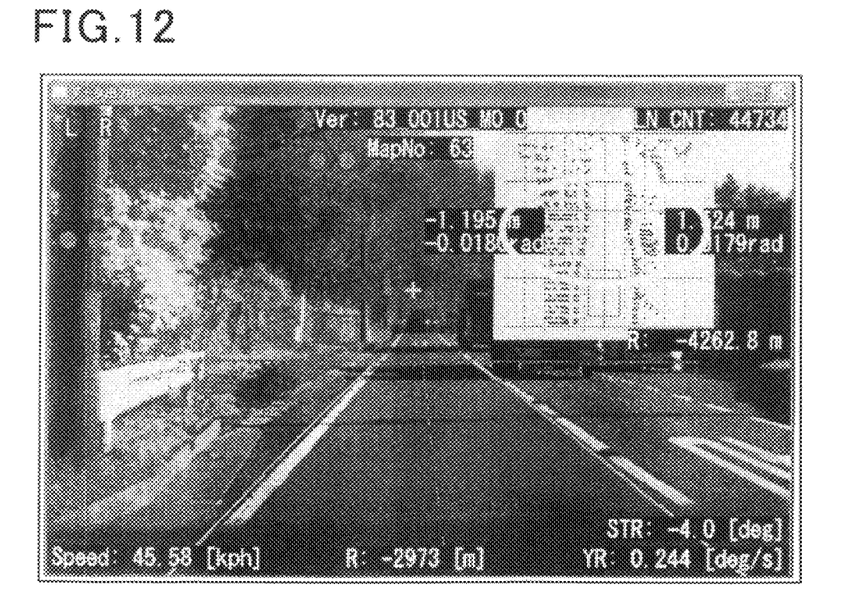
FIG. 12 is a view illustrating image data in which recognized white lines by the known white-line recognition system are deviated if pitch of the motor vehicle is caused from those if no pitch of the motor vehicle is caused.

FIG. 12 shows that recognized white lines (liner lies in FIG. 12) based on a history of extracted edges of white lines based on successively picked-up frame images with the pitch of the motor vehicle being caused may be incorrect because the liner lines are more tapered than the linear lines illustrated in FIG. 11.

In view of the circumstances set forth above, an aspect of the present disclosure seeks to provide lane-marker recognition systems installed in corresponding vehicles and designed to address the point that should be improved in the white-line recognition systems set forth above.

Specifically, an alternative aspect of the present disclosure aims to provide such a lane-marker recognition system having an improved recognition performance of lane markers formed on a road ahead of the corresponding vehicle even if pitch of the vehicle is caused.

According to one aspect of the present disclosure, there is provided a lane-marker recognition system installed in a vehicle. The system includes an image pickup unit that repeatedly picks up a frame image of a target region including a road ahead of the vehicle, and an edge extracting unit that extracts an edge of a lane marker formed on the road from each of the frame images picked-up by the image pickup unit. The system includes a history creating unit that creates a history of the edges of the lane marker for the respective frame images by storing the edges of the lane marker for the respective frame images, and a pitch detecting unit that detects pitch of the vehicle. The history creating unit is configured to omit, as a target edge, an edge from the history of the edges for the respective frame images. The target edge to be omitted is extracted from one of the frame images. The one of the frame images is picked up by the image pickup unit with the pitch being detected by the pitch detecting unit. The system includes a lane-marker recognizing unit that recognizes a region of the lane marker based on the history of the edges of the lane marker.

According to another aspect of the present disclosure, there is provided a lane-marker recognition system installed in a vehicle. The system includes an image pickup unit that repeatedly picks up a frame image of a target region including a road ahead of the vehicle, and a pitch determining unit that determines whether pitch of the vehicle is caused each time a corresponding one of the frame images is picked up by the image pickup unit. The system includes an edge extracting unit that extracts an edge of a lane marker formed on the road from each of the frame images picked-up by the image pickup unit, and a history creating unit that creates a history of the edges of the lane marker for the respective frame images picked up by the image pickup unit by storing the edges of the lane marker for the respective frame images except for an edge as a target edge. The target edge is extracted from one of the frame images, and the one of the frame images is picked up by the image pickup unit when it is determined that the pitch of the vehicle is caused. The system includes a lane-marker recognizing unit that recognizes a region of the lane marker based on the history of the edges of the lane marker.

According to a further aspect of the present disclosure, there is provided a computer program product including a computer usable medium, and a set of computer program instructions embodied on the computer useable medium. The instructions include a first instruction to capture frame images of a target region including a road ahead of a vehicle repeatedly picked up by an image pickup unit, a second instruction to extract an edge of a lane marker formed on the road from each of the frame images, a third instruction to create a history of the edges of the lane marker for the respective frame images by storing the edges of the lane marker for the respective frame images, and a fourth instruction to recognize a region of the lane marker based on the history of the edges of the lane marker. The instructions include a fifth instruction to detect pitch of the vehicle. The third instruction is to omit, as a target edge, an edge from the history of the edges for the respective frame images. The target edge to be omitted is extracted from one of the frame images. The one of the frame images is picked up by the image pickup unit with the pitch being detected based on the fifth instruction.

According to a still further aspect of the present disclosure, there is provided a computer program product including a computer usable medium, and a set of computer program instructions embodied on the computer useable medium. The instructions include a first instruction to capture frame images of a target region including a road ahead of a vehicle repeatedly picked up by an image pickup unit, a second instruction to determine whether pitch of the vehicle is caused each time a corresponding one of the frame images is picked by the image pickup unit, and a third instruction to extract an edge of a lane marker formed on the road from each of the frame images picked up by the image pickup unit. The instructions include a fourth instruction to create a history of the edges of the lane marker for the respective frame images picked by the image pickup unit by storing the edges of the lane marker for the respective frame images except for an edge as a target edge. The target edge is extracted from one of the frame images. The one of the frame images is picked up by the image pickup unit when it is determined that the pitch of the vehicle is caused. The instructions include a fifth instruction to recognize a region of the lane marker based on the history of the edges of the lane marker.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

(a) of FIG. 3 is a view schematically illustrating an example of frame images picked up by a camera illustrated in FIG. 1 according to the embodiment.

(b) of FIG. 3 is a view schematically illustrating an enlarged view of a part of a road area of the frame image illustrated in (a) of FIG. 3, which shows a plurality of scan lines according to the first embodiment.

(c) of FIG. 3 is a bird's eye view representing edges extracted in the frame image illustrated in (a) of FIG. 3.

(a) of FIG. 4 is a view schematically illustrating an example of a distribution curve of pixel values of all pixels on a target scan line according to the embodiment.

(b) of FIG. 4 is a view schematically illustrating an example of a distribution curve of differential values of the pixel values of all pixels on the target scan line according to the embodiment.

(c) of FIG. 4 is a view schematically illustrating an example of a distribution curve of absolute values of the differential values of the pixel values of all pixels on the target scan line according to the embodiment.

(a) of FIG. 6 is a bird's eye view schematically illustrating extracted edges for a current frame image and a pair of lines calculated in step S50 of FIG. 2 therefor if no pitch of the motor vehicle is caused.

(b) of FIG. 6 is a bird's eye view schematically illustrating extracted edges for a current frame image and a pair of lines calculated in step S50 of FIG. 2 therefor if pitch of the motor vehicle is caused.

(a) of FIG. 7 is a view schematically illustrating a schematic form of a history file according to the embodiment.

(b) of FIG. 7 is a view schematically illustrating the updating of the history file illustrated (a) of FIG. 7 if no pitch of the motor vehicle MV is caused in a current frame image.

(c) of FIG. 7 is a view schematically illustrating the updating of the history file illustrated (a) of FIG. 7 if pitch of the motor vehicle MV is caused in the current frame image.

(a) of FIG. 8 is a bird's eye view schematically illustrating the updating of the history file illustrated (a) of FIG. 7 if no pitch of the motor vehicle is caused in a current frame image.

(b) of FIG. 8 is a bird's eye view schematically illustrating the updating of the history file illustrated (a) of FIG. 7 if pitch of the motor vehicle is caused in the current frame image.

DETAILED DESCRIPTION OF EMBODIMENT

An embodiment of the present disclosure will be described hereinafter with reference to the accompanying drawings. In the drawings, identical reference characters are utilized to identify identical corresponding components.

This embodiment of the present disclosure is, as an example, applied to a lane-marker recognition system 1 installed in a motor vehicle MV.

Note that, in the specification, "lane markers" mean boundary markers, such as painted lines (white or orange solid/dashed lines) and raised markers, which are formed on a road and work to divide the road into plural parts as lanes.

Figure 1:
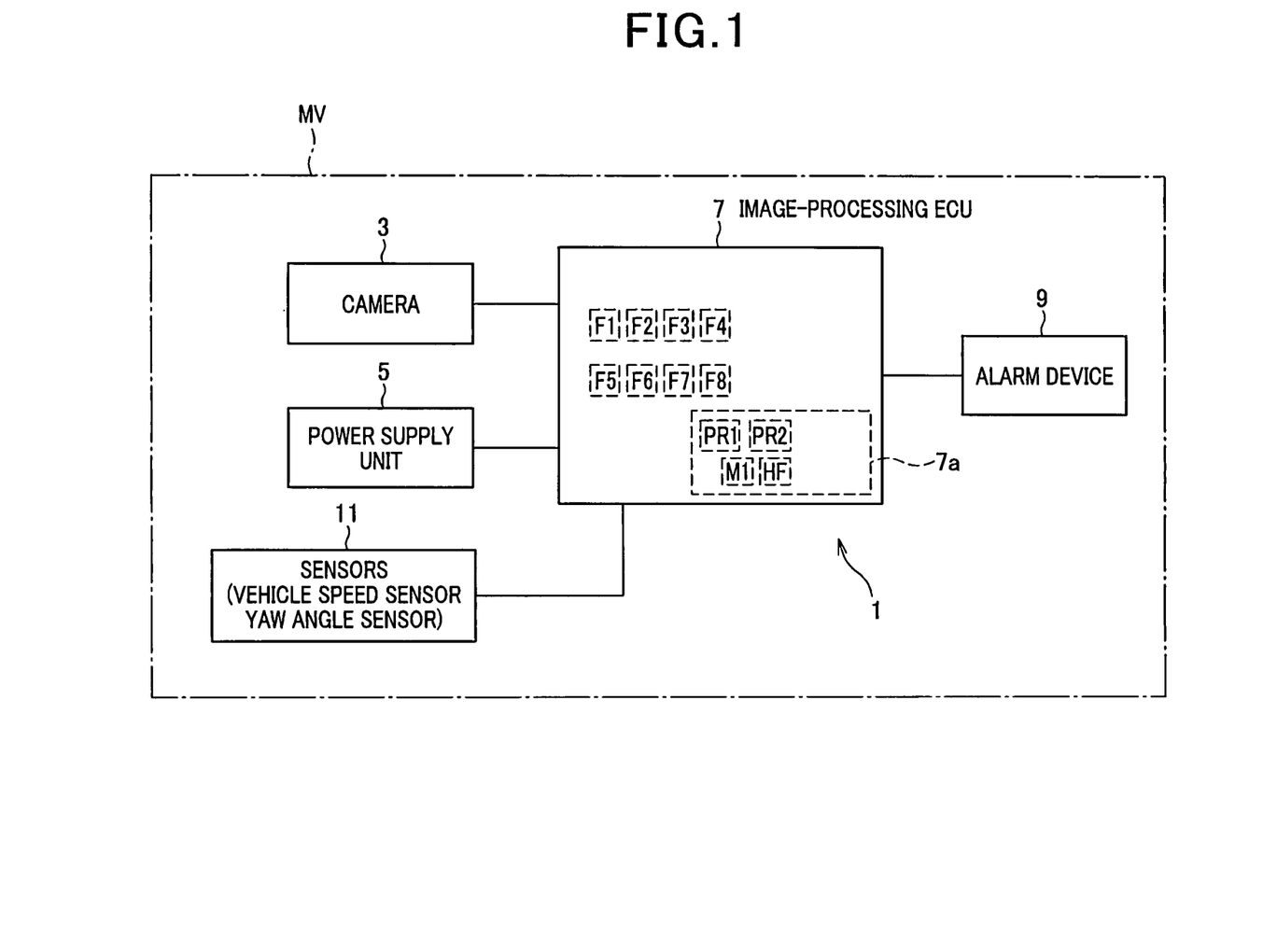
FIG. 1 is a block diagram schematically illustrating an example of the overall hardware structure of a lane-marker recognition system installed in a motor vehicle according to an embodiment of the present disclosure.

Referring to FIG. 1, the lane-marker recognition system 1 is comprised of a camera 3 as an example of image pickup means, a power supply unit 5, an image-processing ECU 7, and an alarm device 9, such as a buzzer. Each of the camera 3, the power supply unit 5, and the alarm device 9 is communicably connected to the image-processing ECU 7. With the image-processing ECU 7, sensors 11 including a vehicle speed sensor and a yaw angle sensor are communicably connected.

The power supply unit 5 is, for example, a chargeable battery and operative to supply electric power to each of the camera 3, the image-processing ECU 7, and the alarm device 9 while an electric system of the motor vehicle MV including the lane-marker recognition system 1 is activated during an ignition switch (not shown) of the motor vehicle MV being on.

The camera 3 is, for example, a CCD camera, and mounted on a portion of the body (outer shell) of the motor vehicle at which the camera 3 can pick up images ahead of the motor vehicle MV. For example, the camera 3 is mounted on the front side of the body (outer shell) of the motor vehicle MV. The camera 3 has a field of view (an area that the camera 3 can pick up), and the field of view includes a predetermined target region on a road (road surface) ahead of the motor vehicle MV. The target region includes a road ahead of the motor vehicle MV.

The camera 3 is operative to successively pick up two-dimensional images (frame images) of the predetermined target region on a road ahead of the motor vehicle MV. The vertical direction and horizontal direction of each picked-up image correspond to the forward direction and the width direction of the vehicle, respectively.

Each picked-up image for example consists of a plurality of pixels arrayed in matrix; each of the pixels represents the light intensity (luminance) of a corresponding location thereof.

For example, the camera 3 is comprised of an optical system, a shutter, a CCD, an amplifier, an A/D converter, and a controller. The optical system includes a lens for collecting and focusing light, and an aperture as an opening with an adjustable size, which allows part of the light collected by the lens to pass therethrough to thereby control the amount of light to be picked up by the CCD. The shutter is designed to be openable and operative to control the time (exposure time) during which the light passing through the aperture reaches the CCD. That is, the opening speed (shutter speed) determines the time during which the light passing through the aperture reaches the CCD.

The CCD consists of a plurality of light-sensitive elements arrayed in matrix constituting a light sensitive pixel area; each of the light-sensitive elements corresponds to one pixel of an image to be picked up by the CCD.

When light is received by the light sensitive pixel area of the CCD, the received light is converted into an electric analog image (frame image) by the light-sensitive elements. The frame image is amplified by the amplifier using an adjustable gain, and the amplified frame image is converted into a digital frame image with, for example, 8-bit gray scale (256 levels of gray scale). Thus, the light intensity (luminance) of a frame image picked by each light-sensitive element of the CCD is converted into a value (pixel value, gray value, or intensity value) of a corresponding pixel of a digital frame image within the range from 0 to 255. The frame image can be converted into a digital frame image, and the digital frame image can be amplified using an adjustable gain.

The digital frame image is outputted from the camera 3 to the image-processing ECU 7. Thus, the camera 3 is configured to successively take frame images of the target region on a road ahead of the motor vehicle MV at a preset frame rate, and successively output digital frame images corresponding to the taken frame images to the image-processing ECU 7.

The controller of the camera 3 is operative to adjust the shutter speed, the gain, and the frame rate according to instructions sent from the image-processing ECU 7.

The image-processing ECU 7 is designed as, for example, a normal microcomputer circuit consisting of, for example, a CPU; a storage medium 7a including a ROM (Read Only Memory), such as a rewritable ROM, a RAM (Random Access Memory), and the like; an I/O (Input and output) interface; buses; and so on. The CPU, the storage medium 7a, and the I/O interface are communicably connected with each other via the buses. The storage medium 7a stores therein beforehand various programs including a lane-marker recognition program PR1 and a lane departure determining program PR2.

The vehicle speed sensor 11 is operative to measure the speed of the motor vehicle MV and output, to the image-processing ECU 7, the measured speed of the motor vehicle MV. The yaw angle sensor 11 is operative to measure the yaw angle (the angle of deviation between the longitudinal axis of the motor vehicle MV and its true direction of motion) of the motor vehicle MV, and output, to the image-processing ECU 7, the measured yaw angle.

The image-processing ECU 7 is operative to output, to the controller of the camera 3, the instructions that cause the controller of the camera 3 to adjust the shutter speed, the frame rate, and the gain of the camera 3 so that the brightness (luminance) of frame images picked-up by the camera 3 is within a predetermined range.

In addition, the image-processing ECU 7 is designed to run the lane-marker recognition program PR1 using frame image data inputted from the camera 3 described later, thus recognizing (detecting) lane markers (lane boundary markers) formed on a road in front of the motor vehicle MV. In other words, the lane-marker recognition program PR1 causes the image-processing ECU 7 to function as an edge extractor F1, a history creator F2, a lane-marker recognizer F3, and a pitch detector F4 described later.

The image-processing ECU 7 is also designed to run the lane departure determining program PR2 to thereby:

determine a lane on which the motor vehicle MV is running based on the recognized lane markers;

determine a distance of the motor vehicle MV to each of the recognized lane markers;

determine whether the motor vehicle MV will depart from the determined lane based on the determined distances, the measured speed of the motor vehicle MV, and the measured yaw angle; and output an alarm signal to the alarm device 9 when it is determined that the motor vehicle MV will depart from the determined lane.

In other words, the lane departure determining program PR2 causes the image-processing ECU 7 to function as a lane determiner F5, a distance determiner F6, a lane departure determiner F7, and an alarm signal output unit F8.

The alarm device 9 is equipped with a speaker and/or a display and operative to output, from the speaker, an audible alarm and/or output, on the display, a visible alarm (warning message) based on the alarm signal outputted from the image-processing ECU 7; the audible alarm and the visible alarm, for example, prompt the driver of the motor vehicle MV to operate the steering wheel so as to prevent the lane departure.

Next, a lane-marker recognition task to be run by the image-processing ECU 7 in accordance with the lane-marker recognition program PR1 will be described hereinafter with reference to FIGS. 2 to 8. The lane-marker recognition program PR1 is launched so that the lane-marker recognition task is started when the ignition switch is turned on.

Figure 2:
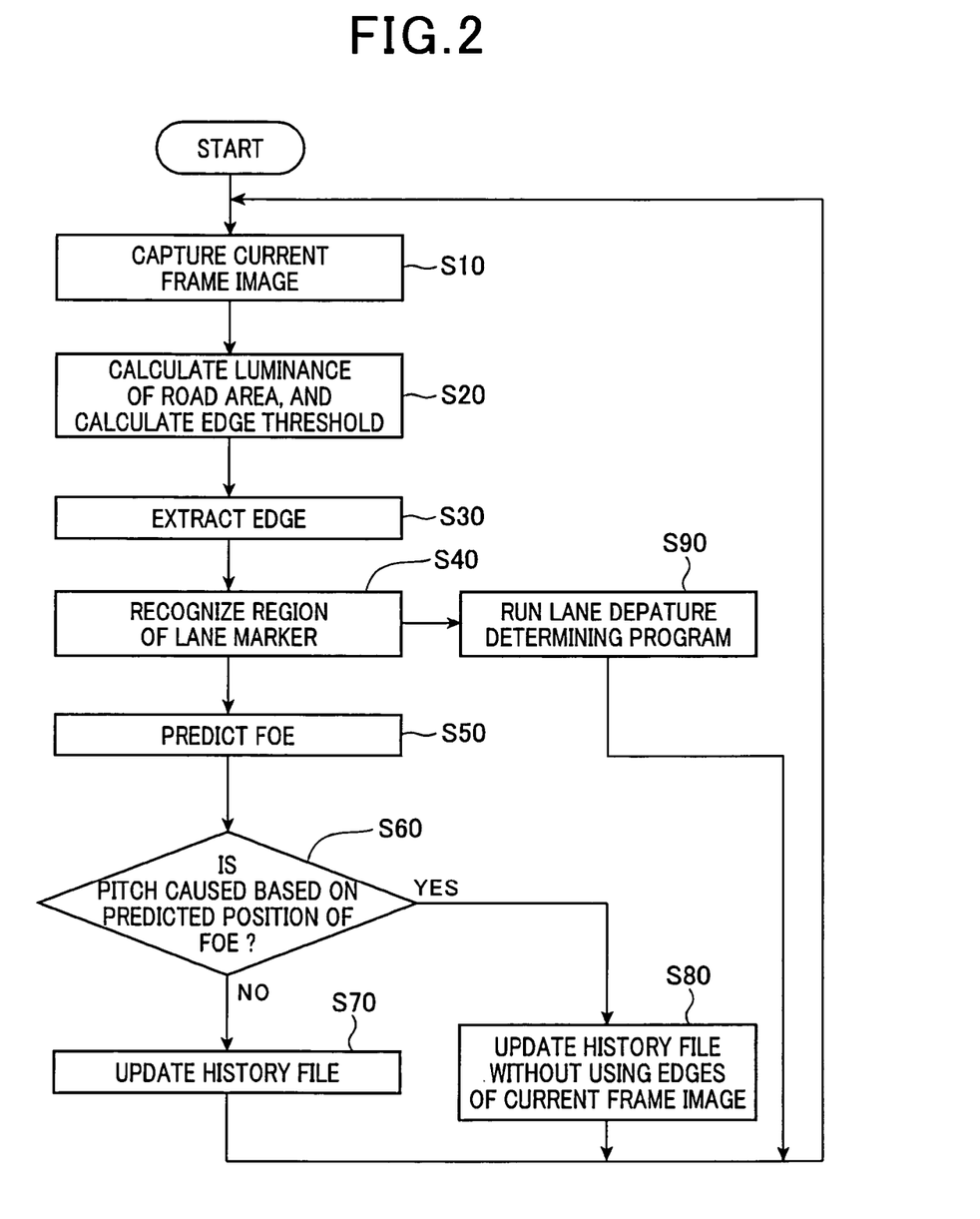
FIG. 2 is a flowchart schematically illustrating a lane-marker recognition task to be run by an image-processing ECU illustrated in FIG. 1 according to the embodiment.
Figure 3:
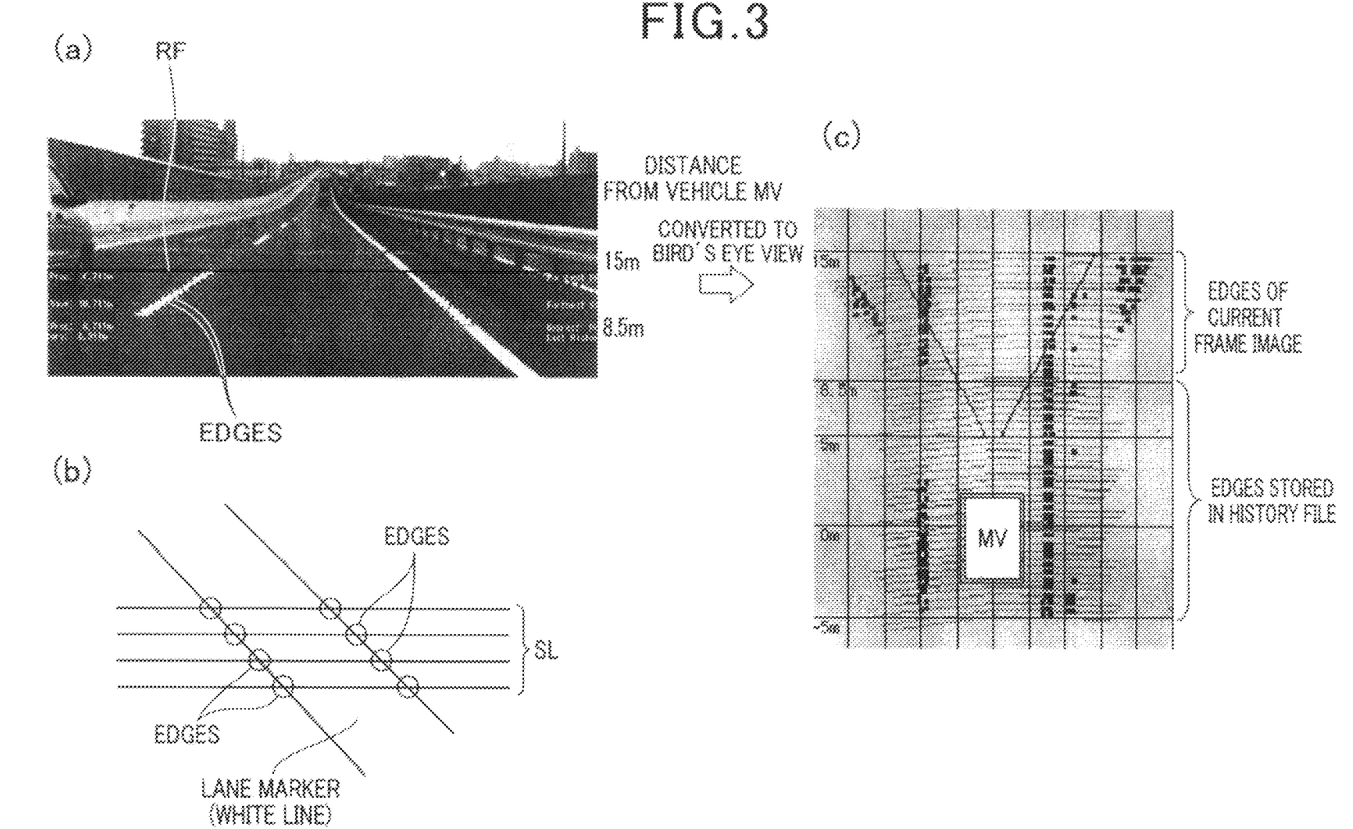

When launching the lane-marker recognition program PR1, the image-processing ECU 7, referred to simply as an "ECU 7", captures a digital frame image as a current frame image picked up by the camera 3 and outputted therefrom in step S10. As described above, the target region to be taken by the camera 3 as frame images includes a road in front of the motor vehicle MV. An example of frame images picked up by the camera 3 is illustrated in (*a*) of FIG. 3. As described later, the lane-marker recognition task is repeatedly carried out by the ECU 7 each time a digital frame image is captured and outputted from the camera 3 as a current frame image. In other words, after the lane-marker recognition task has been applied for a frame image, when a new frame image is picked up by the camera 3 and captured by the ECU 7 as a current frame image, the frame image for which the lane-marker recognition task has been applied will be referred to as the previous frame image.

Next, the ECU 7 calculates a value of the luminance (light intensity) of an area, referred to as a "road area", in the current frame image corresponding to a part of the road in front of the motor vehicle MV without including lane markers, and calculates a value of an edge threshold based on the calculated value of the light intensity of the road area in step S20.

For example, the ECU 7 calculates the value of the light intensity of the road area in the following specific approach.

The ECU 7 takes the intensity value (pixel value) of each pixel of the road area in the current frame image; this road area is for example illustrated as an area enclosed by a rectangular frame RF (see (a) of FIG. 3). The ECU 7 arranges all pixels of the road area in the current frame image in descending order of their intensity values, and excludes pixels whose orders are within the highest order and a predetermined high order. This is because the pixels to be excluded may be pixels of areas corresponding to lane markers and/or noises so that their intensity values may be higher than the intensity values of the remaining pixels of the road area without including lane markers.

The ECU 7 calculates an average value of the intensity values of the remaining pixels of the road area as a "value of light intensity of road without including lane markers", referred to simply as a "value of light intensity of road".

In addition, the ECU 7 stores therein a map M1 designed as, for example, a data table, a program, and/or a formula; this map M1 represents a variable of the edge threshold as a desired function of a variable (parameter) of the light intensity of road. The function can have been determined based on data obtained by tests and/or simulations using the motor vehicle MV or its equivalent computer model.

Specifically, in step S20, the ECU 7 references the map M1 using the value of the light intensity of road calculated set forth above as a key to thereby extract a value of the edge threshold corresponding to the calculated value of the light intensity of road. Then, the ECU 7 stores the determined value of the edge threshold in the storage medium 7a.

In step S30, the ECU 7 extracts edges of lane markers on the road ahead of the motor vehicle MV in the current frame image in, for example, the following specific approach.

First, the ECU 7 establishes a plurality of scan lines SL on the road area of the current frame image in the horizontal direction (see (b) of FIG. 3), and calculates a distribution curve of differential values (changes) of the intensity values of all pixels on each of the plurality of scan lines SL.

Figure 4:
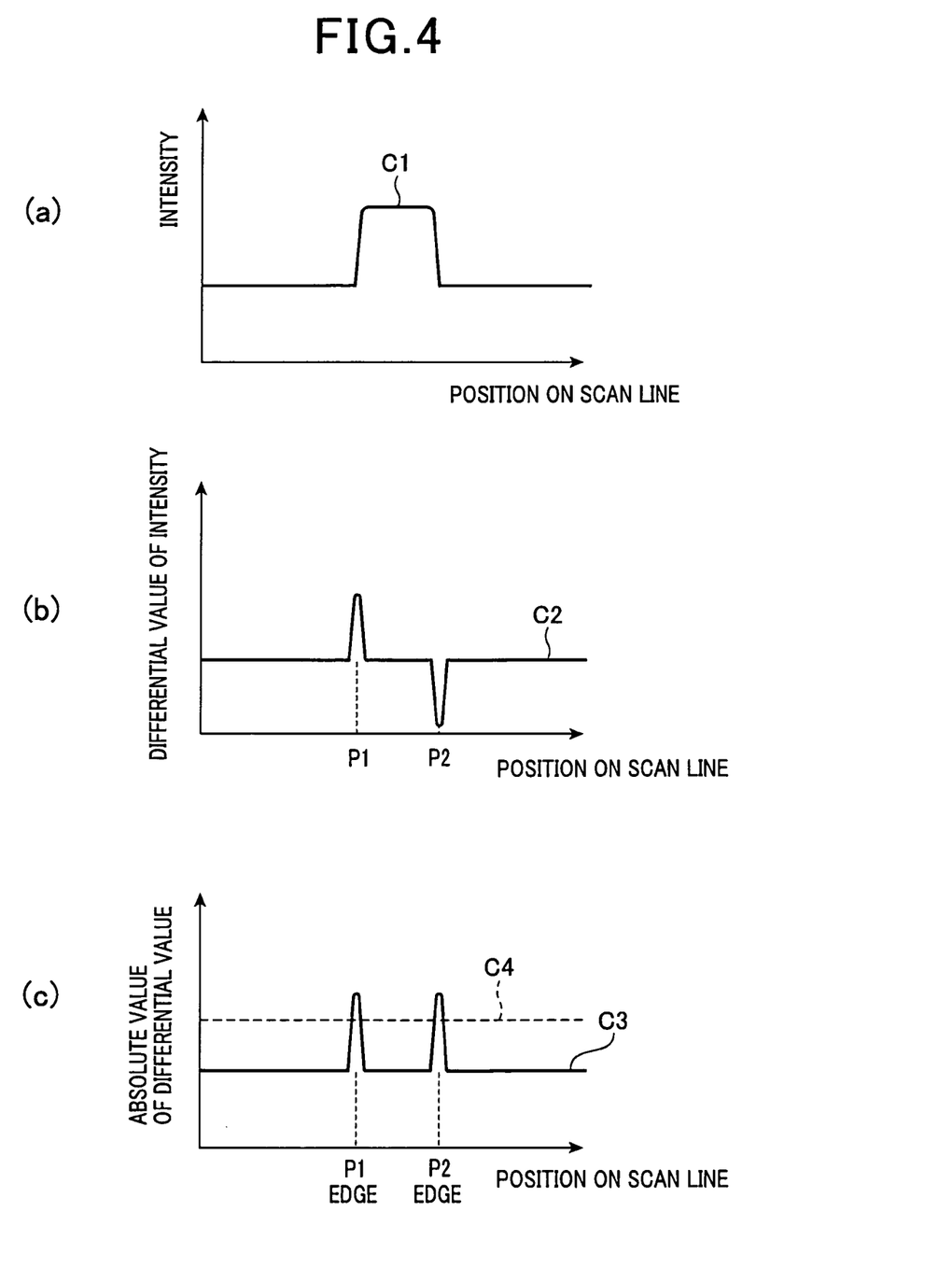
Figure 5:
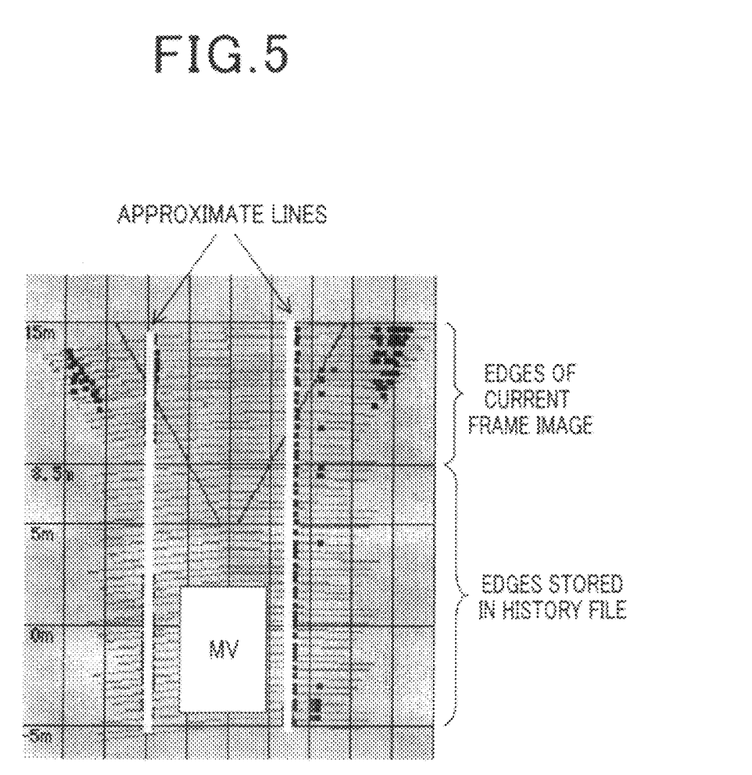
FIG. 5 is a bird's eye view schematically illustrating how to recognize lane markers (white lines) on a road ahead of a motor vehicle illustrated in FIG. 1.

For example, an example of a distribution curve C1 of the pixel values of all pixels on a target scan line is illustrated in (a) of FIG. 4 whose horizontal axis represents a position (pixel) in the target scan line and whose vertical axis represents the pixel values. (a) of FIG. 4 shows that the intensity values of some pixels on the target scan line, which correspond to lane markers, such as white lines, are higher than those of the remaining intensity values of the remaining pixels on the target scan line; these remaining pixels correspond to the road area without including the lane markers.

When the distribution curve C1 of the pixel values of all pixels on the target scan line is illustrated in (a) of FIG. 4, a distribution curve C2 of the differential values of the pixel values of all pixels on the target scan line is obtained as illustrated in (b) of FIG. 4 whose horizontal axis represents a position (pixel) in the target scan line and whose vertical axis represents the differential values. As illustrated in (b) of FIG. 4, the distribution curve C2 includes a pair of a positive peak value at a position (pixel) P1 on the target scan line and a negative peak value at a position (pixel) P2 on the target scan line.

Second, the ECU 7 calculates a distribution curve of absolute values of the differential values of the intensity values of all pixels on each of the plurality of scan lines SL.

When the distribution curve C2 of the differential values of the pixel values of all pixels on the target scan line is illustrated in (b) of FIG. 4, a distribution curve C3 of the absolute values of the differential values of the pixel values of all pixels on the target scan line is obtained as illustrated in (c) of FIG. 4 whose horizontal axis represents a position (pixel) in the scan line and whose vertical axis represents the absolute values of the differential values. As illustrated in (c) of FIG. 4, the distribution curve C3 includes a pair of positive peak values at the respective positions (pixels) P1 and P2 on the target scan line.

Third, the ECU 7 calculates a distribution curve of the value of the edge threshold stored in the storage medium 7a for each of the plurality of scan lines; the value of the edge threshold for each of the plurality of scan lines is constant irrespective of the position on a corresponding one of the plurality of scan lines. For example, when the distribution curve C3 of the absolute values of the differential values of the pixel values of all pixels on the target scan line illustrated in (c) of FIG. 4, a distribution curve C4 of the value of the edge threshold for the target scan line is obtained as illustrated in (c) of FIG. 4.

Fourth, the ECU 7 overlays the distribution curve of the value of the edge threshold for each of the scan lines on the distribution curve of the absolute values of the differential values of the intensity values of all pixels on a corresponding one of the plurality of scan lines SL.

For example, when the distribution curve of the absolute values of the differential values of the intensity values of all pixels on the target scan line is illustrated in (c) of FIG. 4, the distribution curve of the value of the edge threshold is overlaid on the distribution curve of the absolute values of the differential values of the pixel values of all pixels on the target scan line (see (c) of FIG. 4).

Fifth, the ECU 7 extracts, as edges of lane markers, positions of pixels, which correspond to the paired positive peak values, on each of the plurality of scan lines SL if the paired peak values are higher than the distribution curve of the value of the edge threshold for a corresponding one of the scan lines SL. For example, as illustrated in (c) of FIG. 4, the ECU 7 extracts, as edges of a lane marker, the positions (pixels) P1 and P2, which correspond to the paired positive peak values on the target scan line and are higher than the distribution curve C4 of the value of the edge threshold for the target scan line.

As a result, edges of lane markers in the current frame image are extracted along the traveling direction of the motor vehicle MV.

For example, (a) of FIG. 3 shows an example of the extracted edges in the current frame image; the vertical axis represents the changes in the distance from the motor vehicle MV. (c) of FIG. 3 is a bird's eye view constructed in the storage medium 7a by projecting, by the ECU 7, the extracted edges, the position of the motor vehicle MV, and the relative distances between the motor vehicle MV and the respective edges.

In (c) of FIG. 3, the range described as "EDGES OF CURRENT FRAME IMAGE" is the range of edges of the current frame image extracted in step S30 for the current frame image, and the range described as "EDGES STORED IN HISTORY FILE" is the range of edges that have been extracted in step S30 for the previous frame images and stored a history file HF described later.

Following the operation in step S30, the ECU 7 calculates a pair of lines (approximate lines) using, for example, a fitting approach (see FIG. 5) in various recognition approaches in step S40. Specifically, one of the pair of lines is fitted to a first number of the extracted edges for the current frame image and the extracted edges for the previous frame images; the first number of the extracted edges is arranged on the right side of the motor vehicle MV in the travelling direction. The one of the pair of lines passes through the largest number of edges in the first number of the extracted edges for the current frame image and the previous frame images. The other of the pair of lines is fitted to a second number of the extracted edges for the current frame image and the extracted edges for the previous frame images; the second number of the extracted edges is arranged on the left side of the motor vehicle MV in the travelling direction. The other of the pair of lines passes through the largest number of edges in the second number of the extracted edges for the current frame image and the previous frame images.

The pair of approximate lines shows a pair of lane markers (right and left white lines). Thus, the ECU 7 recognizes a region (lane-marker region) of each of the pair of approximate lines as a region of the pair of lane markers (white lines) in step S40.

As described above, the ECU 7 (or an alternative ECU connected to the ECU 7) runs the lane departure determining program PR2 based on the recognized lane markers in step S90, going to step S10.

Following the operation in step S40, the ECU 7 predicts a focus of expansion (FOE) in step S50.

Figure 6:
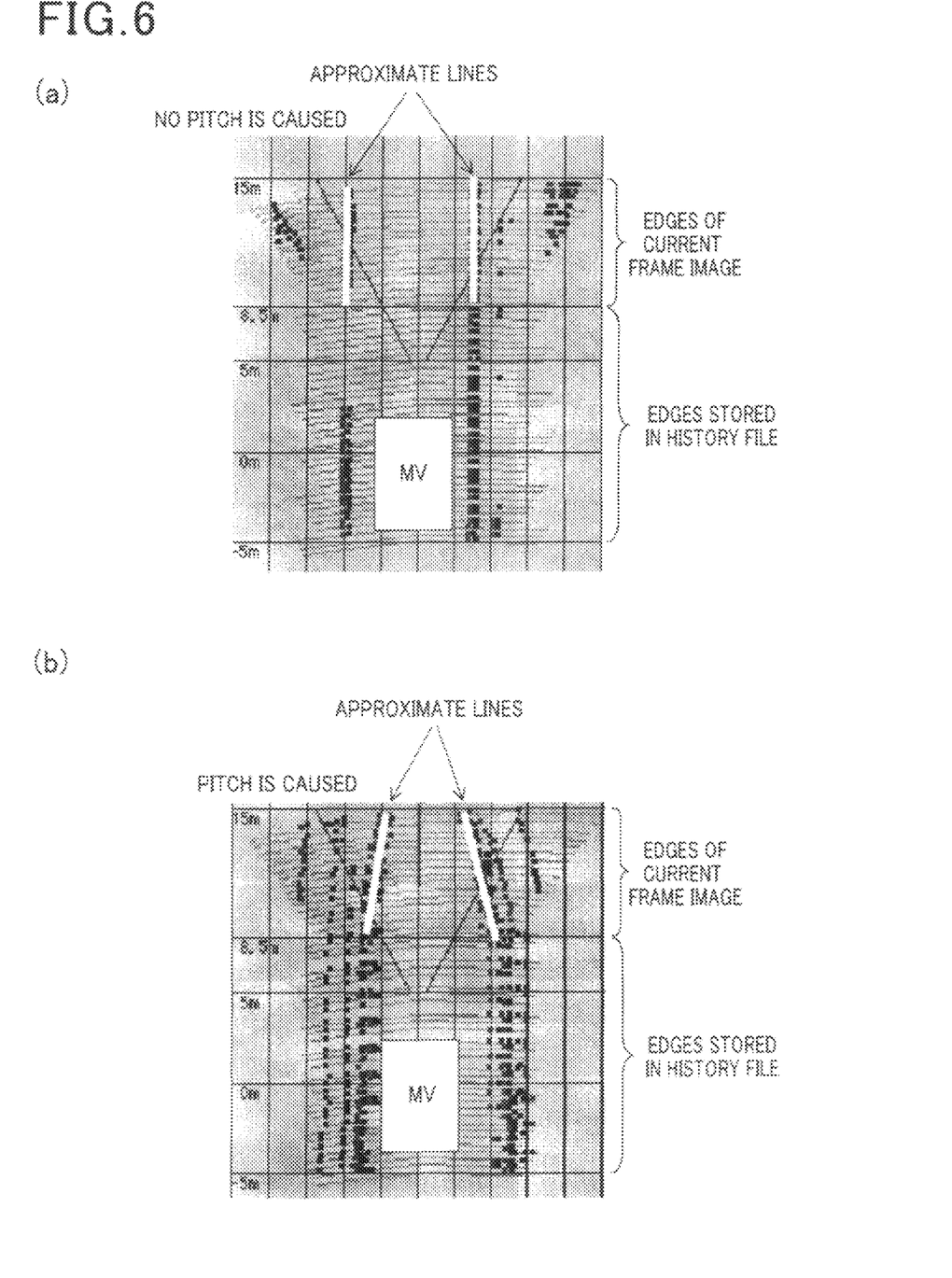

Specifically, as illustrated in FIG. 6, the ECU 7 calculates a pair of lines fitted to a third number of the extracted edges for the current frame image only; the third number of the extracted edges is arranged on the right side of the motor vehicle MV in the travelling direction. The one of the pair of lines passes through the largest number of edges in the third number of the extracted edges for the current frame image only. The other of the pair of lines is fitted to a fourth number of the extracted edges for the current frame image only; the fourth number of the extracted edges is arranged on the left side of the motor vehicle MV in the travelling direction. The other of the pair of lines passes through the largest number of edges in the fourth number of the extracted edges for the current frame image only.

Then, the ECU 7 calculates the position of the FOE of the pair of lines viewed from the motor vehicle MV based on the pair of lines.

(a) of FIG. 6 illustrates the extracted edges for the current frame image and the pair of lines calculated in step S50 therefor if no pitch of the motor vehicle MV is caused. Because the third number of the extracted edges for the current frame image only and the fourth number of the extracted edges therefor are not tapered so that the lines of the pair are not tapered, the position of the FOE viewed from the motor vehicle MV is a relatively higher position in Fig. (a) of FIG. 6. In other words, the position of the FOE viewed from the motor vehicle MV is a relatively distant position therefrom.

In contrast, (b) of FIG. 6 illustrates the extracted edges for the current frame image and the pair of lines calculated in step S50 therefor if pitch of the motor vehicle MV is caused (specifically, nose-down pitch is caused). Because the third number of the extracted edges for the current frame image only and the fourth number of the extracted edges therefor are tapered so that the lines of the pair are tapered, the position of the FOE viewed from the motor vehicle MV is a relatively lower position in Fig. (b) of FIG. 6. In other words, the position of the FOE viewed from the motor vehicle MV is a relatively near position therefrom.

That is, the position of the FOE for a frame image during which pitch of the motor vehicle MV is caused is lower (nearer) than the position of the FOE for the same frame image during which no pitch of the motor vehicle MV is caused.

To sum up, when the behavior of the motor vehicle MV shows the nose-down pitch (tail-up pitch), the position of the FOE viewed from the motor vehicle MV is moved downward, and when the behavior of the motor vehicle MV shows the nose-up pitch (tail-down pitch), the position of the FOE viewed from the motor vehicle MV is moved upward. Then, when the downward movement or the upward movement of the FOE is out of a preset range, the ECU 7 determines that pitch of the motor vehicle MV is caused.

Based on the characteristics of the FOE, the ECU 7 compares the position of the FOE predicted in step S50 for the current frame image with that of the FOE predicted in step S50 for the previous frame image that has been captured by the ECU 7 one frame-image before the current frame image.

Upon determining that the position of the FOE predicted in step S50 for the current frame image is lower (nearer) by a preset threshold or above than that of the FOE predicted in step S50 for the previous frame image based on a result of the comparison, the ECU 7 determines that pitch of the motor vehicle MV is caused (YES in step S60), proceeding to step S80.

Otherwise, upon determining that the position of the FOE predicted in step S50 for the current frame image is not lower (nearer) by the preset threshold or above than that of the FOE predicted in step S50 for the previous frame image based on a result of the comparison, the ECU 7 determines that no pitch of the motor vehicle MV is caused (NO in step S60), proceeding to step S70.

Note that, if the current frame image is the first frame image captured by the ECU 7 after the turning on of the ignition switch, the ECU 7 determines that no pitch of the motor vehicle MV is caused (NO in step S60), proceeding to step S70 although no position of the FOE is predicted in step S50 for the previous frame image.

Upon determining that no pitch of the motor vehicle MV is caused (NO in step S60), the ECU 7 updates the history file HF in the storage medium 7a in step S70. As described above, the edges that are extracted in step S30 for each frame image have been stored in the history file HF.

Figure 7:
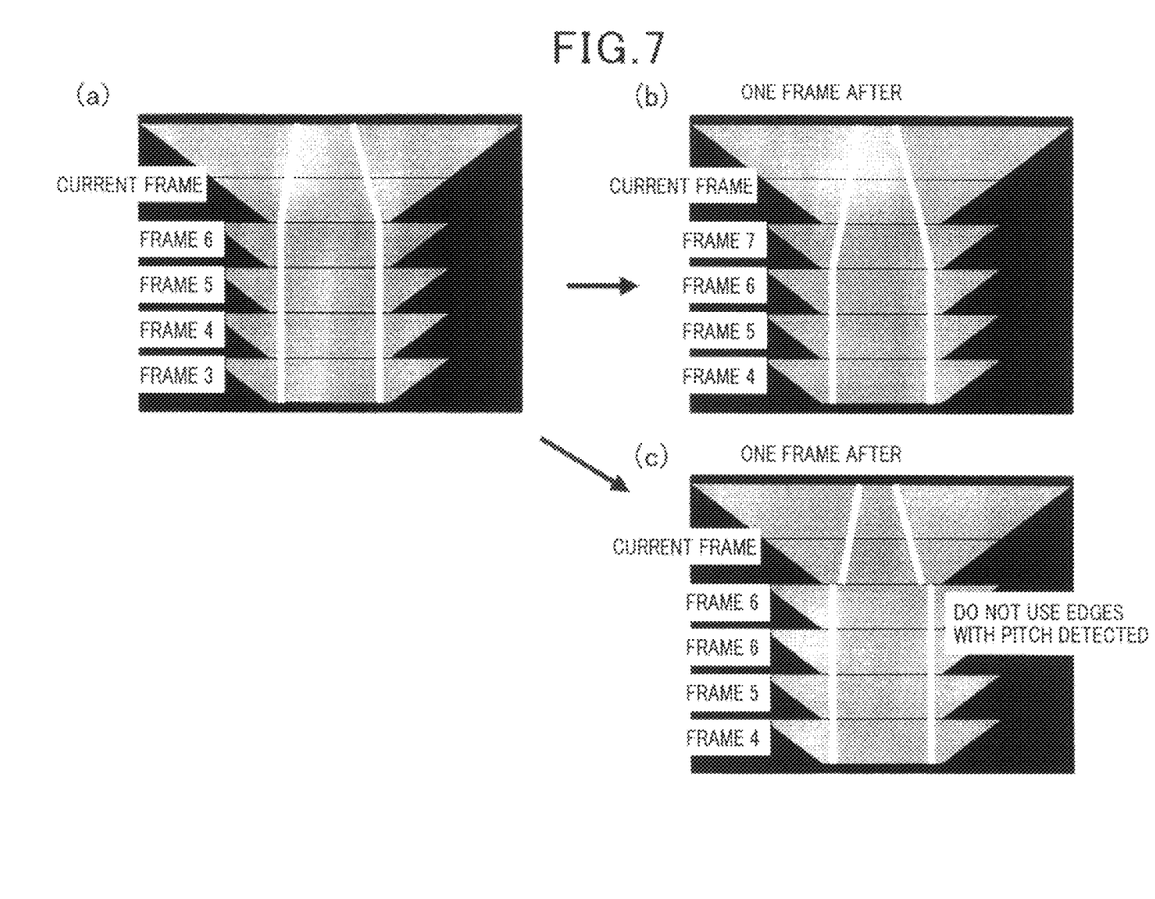

(a) of FIG. 7 illustrates a schematic form of the history file HF. In (a) of FIG. 7, each of "FRAME 3, FRAME 4, FRAME 5, and FRAME 6" represents extracted edges of a corresponding frame image. The FRAMES 3 to 6 have been stored in the history file HF in the order of FRAME 3, FRAME 4, FRAME 5, and FRAME 6. Because the edges (FRAMES 3 to 6) have been extracted during the motor vehicle MV travelling, the frame image corresponding to the FRAME 3 is a frame image of the most rear region of the road in the travelling direction in all of the frame images corresponding to the FRAMES 3 to 6. The frame image corresponding to the FRAME 6 is a frame image of the most forward region of the road in the travelling direction in all of the frame images corresponding to the FRAMES 3 to 6. For example, the intervals of the FRAMES 3 to 6 in the history file HF corresponding to the vertical direction in (a) of FIG. 7 are determined such that the whole of the FRAMES 3 to 6 provides a bird's eye view of the road constructed in the storage medium 7a as illustrated in, for example, (a) and (b) of FIG. 6.

The updating of the history file HF in step S70 will be described with reference to FIGS. 7 and 8. When edges of FRAME 7 for a current frame image are newly extracted with the history file HF being provided as illustrated in (a) of FIG. 7 if it is determined that no pitch is caused in the current frame image, the edges (FRAME 7) are added to the history file HF as edges of the newest frame image, and the edges of the oldest frame image in the history file HF, such as the edges (FRAME 3) are deleted (see (b) of FIG. 7). The position of each of the remaining edges (FRAME 4), edges (FRAME 5), and edges (FRAME 6) is shifted to be one-frame older than its previous one in the rear direction of the motor vehicle MV. More specifically, in step S70, the ECU 7 calculates the travel distance of the motor vehicle MV for the current frame image, and shifts the position of each of the remaining edges (FRAME 4), edges (FRAME 5), and edges (FRAME 6) in the rear direction of the motor vehicle MV by the calculated travel distance.

Figure 8:
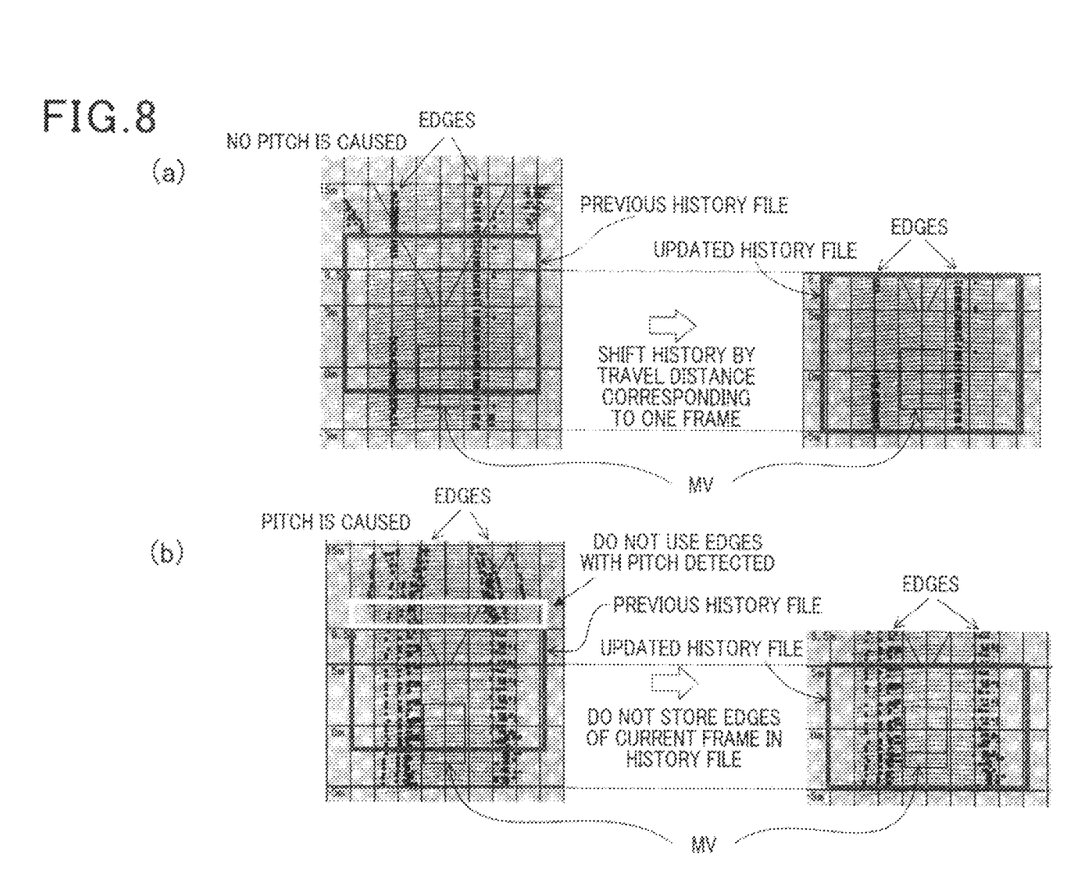

(a) of FIG. 8 schematically illustrates the updating of the previous history file HF illustrated in the form of the bird's eye view to an updated history file HF illustrated in the form of the bird's eye view. In (a) of FIG. 8, the vertical direction represents the traveling direction of the motor vehicle MV, and the range surrounded by a rectangular frame represents the range of a corresponding one of the previous history file HF and the updated history file HF.

Upon determining that pitch of the motor vehicle MV is caused (YES in step S60), the ECU 7 updates the history file HF in the storage medium 7a in step S80.

The updating of the history file HF in step S80 will be described with reference to FIGS. 7 and 8. When edges of FRAME 7 for a current frame image are newly extracted with the history file HF being provided as illustrated in (a) of FIG. 7 if it is determined that pitch is caused in the current frame image, the edges (FRAME 6), which have been extracted for the previous frame image one frame before the current frame image, are added to the history file HF as edges of the newest frame image in place of the current frame image, and the edges of the oldest frame image in the history file HF, such as the edges (FRAME 3) are deleted (see (c) of FIG. 7). The position of each of the remaining edges (FRAME 4), edges (FRAME 5), and edges (FRAME 6) is shifted to be one-frame older than its previous one in the rear direction of the motor vehicle MV. More specifically, in step S70, the ECU 7 calculates the travel distance of the motor vehicle MV for the current frame image, and shifts the position of each of the remaining edges (FRAME 4), edges (FRAME 5), and edges (FRAME 6) in the rear direction of the motor vehicle MV by the calculated travel distance.

(b) of FIG. 8 schematically illustrates the updating of the previous history file HF illustrated in the form of the bird's eye view to an updated history file HF illustrated in the form of the bird's eye view. In (b) of FIG. 8, the vertical direction represents the traveling direction of the motor vehicle MV, and the range surrounded by a rectangular frame represents the range of a corresponding one of the previous history file HF and the updated history file HF.

As illustrated in (b) of FIG. 8, extracted edges for a current frame image in which pitch is caused are not included in the history file HF.

After completion of the operation in step S80, the ECU 7 returns to step S10, and carries out the operations in steps S10 to S90 based on a current frame image captured from the camera 3. In other words, the ECU 7 repeatedly carries out the operations in steps S10 to S90 each time a digital frame image is captured and outputted from the camera 3 as a current frame image.

Figure 9:
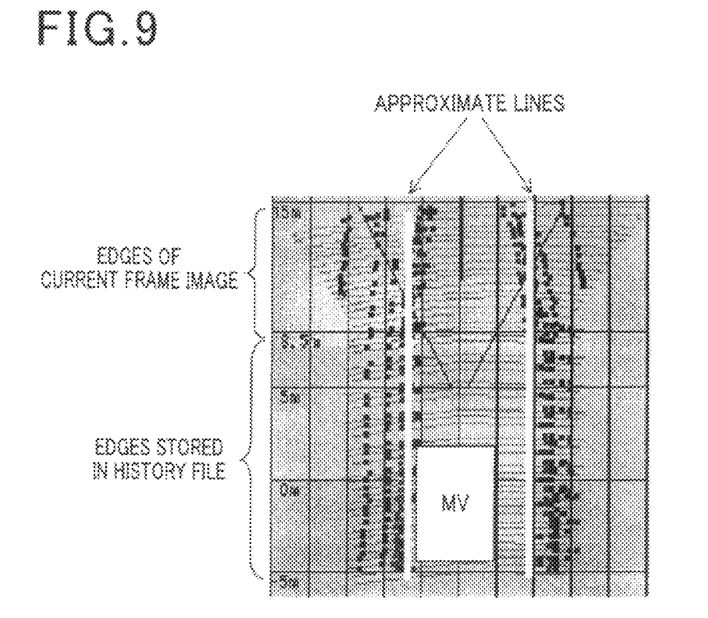
FIG. 9 is a bird's eye view illustrating technical effects to be achieved by the lane-marker recognition system according to the embodiment.
Figure 10:
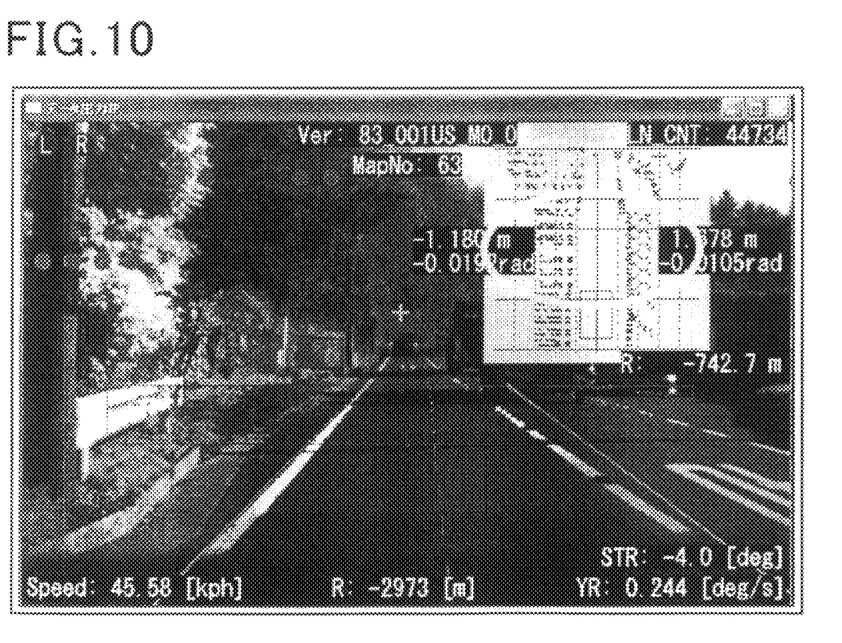
FIG. 10 is a view illustrating image data representing technical effects to be achieved by the lane-marker recognition system according to the embodiment.

As described above, the lane-marker recognition system 1 according to this embodiment is configured to omit, in the history file HF, edges extracted in a current frame image in which pitch of the motor vehicle MV is caused. For this reason, even if a current frame image is captured by the ECU 7 with pitch being caused in the motor vehicle MV, the edges stored in the history file HF are not tapered in comparison to edges extracted for the current frame image (see FIG. 9). Because the load-marker recognition system 1 is designed to recognize lane markers on a road ahead of the motor vehicle MV using the improved history file HF set forth above, the lane-marker recognition system 1 properly recognizes lane markers on a road ahead of the motor vehicle MV even if pitch of the motor vehicle MV is caused (see FIGS. 9 and 10) because linear lines represented as the result of lane markers (white lines) are not tapered in comparison to the white lines illustrated in FIG. 10 affected by the pitch. This improves its recognition performance of lane markers on a road ahead of the motor vehicle MV in comparison to recognition performances of known lane-marker recognition systems.

Note that, as described above, the ECU 7 is programmed to recognize lane markers on a road ahead of the vehicle using, in addition to the edges in the history file HF, extracted edges for a current frame image that may be subjected to pitch of the motor vehicle MV in step S40. However, because the extracted edges for the current frame image have a little influence on the recognition of lane markers in comparison to the edges stored in the history file HF, it is possible to prevent recognized lane markers (white lines) on a road ahead of the motor vehicle MV from being greatly deviated from actual ones even if the operation in step S40 uses extracted edges for a current frame image that may be subjected to pitch of the motor vehicle MV.

The present disclosure is not limited to the aforementioned embodiment, and can be applied in various modified embodiments within the scope of the present disclosure.

For example, the lane-marker recognition system 1 is designed to detect pitch of the motor vehicle MV based on the position of the FOE, but the present disclosure is not limited thereto. Specifically, if the sensors 11 include at least one of a G-sensor (gravity sensor), a damper pressure sensor, an air-suspension pressure sensor, and the like, which can output a signal indicative of information of whether pitch of the motor vehicle MV is caused, the lane-marker recognition system 1 can be designed to detect pitch of the motor vehicle MV is caused based on the signal outputted from the at least one of the sensors in steps S50 and S60.

In steps S50 and S60, the ECU 7 can be designed to calculate the position of the FOE of a pair of parallel lines, which corresponds to, for example, a pair of guardrails, and detect pitch of the motor vehicle MV based on the degree of the movement of the FOE in the vertical direction among temporally adjacent frame images captured by the ECU 7.

In step S40, the ECU 7 can be designed to recognize lane markers on a road ahead of the vehicle using only the edges in the history file HF.

While an illustrative embodiment of the present disclosure have been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A lane-marker recognition system installed in a vehicle, comprising:
an image pickup unit that repeatedly picks up a frame image of a target region including a road ahead of the vehicle;
an edge extracting unit that extracts an edge of a lane marker formed on the road from each of the frame images picked-up by the image pickup unit;
a history creating unit that creates a history of the edges of the lane marker for the respective frame images by storing the edges of the lane marker for the respective frame images;
a pitch detecting unit that detects pitch of the vehicle, the history creating unit being configured to omit, as a target edge, an edge from the history of the edges for the respective frame images, the target edge to be omitted being extracted from one of the frame images, the one of the frame images being picked up by the image pickup unit with the pitch being detected by the pitch detecting unit; and
a lane-marker recognizing unit that recognizes a region of the lane marker based on the history of the edges of the lane marker.

2. The lane-marker recognition system according to claim 1, wherein the lane marker is formed in pair on the road, and the edge extracting unit is configured to extract, as the edge, a plurality of edges of the pair of lane markers from each of the frame images picked-up by the image pickup unit, and the pitch detecting unit is configured to:
calculate, for each of the frame images, a pair of approximate lines based on the plurality of edges, one of the pair of approximate lines being fitted to a first number of the plurality of edges, the other of the pair of approximate lines being fitted to a second number of the plurality of edges;
calculate a position of a focus of expansion of the pair of approximate lines calculated for each of the frame images; and
determine whether the pitch of the vehicle is caused based on a change of the calculated positions of the focus of expansion between the frame images.

3. The lane-marker recognition system according to claim 1, wherein the history creating unit is configured to store, in place of the target edge to be omitted, an edge of the lane marker extracted from an alternative one of the frame images, the alternative one of the frame images being picked up by the image pickup unit one frame-image before the one of the frame images.

4. A lane-marker recognition system installed in a vehicle, comprising:
an image pickup unit that repeatedly picks up a frame image of a target region including a road ahead of the vehicle;
a pitch determining unit that determines whether pitch of the vehicle is caused each time a corresponding one of the frame images is picked up by the image pickup unit;
an edge extracting unit that extracts an edge of a lane marker formed on the road from each of the frame images picked-up by the image pickup unit;
a history creating unit that creates a history of the edges of the lane marker for the respective frame images picked up by the image pickup unit by storing the edges of the lane marker for the respective frame images except for an edge as a target edge, the target edge being extracted from one of the frame images, the one of the frame images being picked up by the image pickup unit when it is determined that the pitch of the vehicle is caused; and
a lane-marker recognizing unit that recognizes a region of the lane marker based on the history of the edges of the lane marker.

5. A computer program product comprising:
a computer usable non-transitory storage medium; and
a set of computer program instructions embodied on the computer useable non-transitory storage medium, the instructions including:
a first instruction to capture frame images of a target region including a road ahead of a vehicle repeatedly picked up by an image pickup unit;
a second instruction to extract an edge of a lane marker formed on the road from each of the frame images;
a third instruction to create a history of the edges of the lane marker for the respective frame images by storing the edges of the lane marker for the respective frame images;
a fourth instruction to recognize a region of the lane marker based on the history of the edges of the lane marker; and
a fifth instruction to detect pitch of the vehicle,
wherein the third instruction is to omit, as a target edge, an edge from the history of the edges for the respective frame images, the target edge to be omitted being extracted from one of the frame images, the one of the frame images being picked up by the image pickup unit with the pitch being detected based on the fifth instruction.

6. A computer program product comprising:
a computer usable non-transitory storage medium; and
a set of computer program instructions embodied on the computer useable non-transitory storage medium, the instructions including:
a first instruction to capture frame images of a target region including a road ahead of a vehicle repeatedly picked up by an image pickup unit;
a second instruction to determine whether pitch of the vehicle is caused each time a corresponding one of the frame images is picked by the image pickup unit;
a third instruction to extract an edge of a lane marker formed on the road from each of the frame images picked up by the image pickup unit;
a fourth instruction to create a history of the edges of the lane marker for the respective frame images picked by the image pickup unit by storing the edges of the lane marker for the respective frame images except for an edge as a target edge, the target edge being extracted from one of the frame images, the one of the frame images being picked up by the image pickup unit when it is determined that the pitch of the vehicle is caused; and
a fifth instruction to recognize a region of the lane marker based on the history of the edges of the lane marker.

* * * * *